No. 701,339. Patented June 3, 1902.
F. A. HEADSON.
ROTARY ENGINE.
(Application filed Nov. 15, 1900.)
(No Model.) 6 Sheets—Sheet 3.
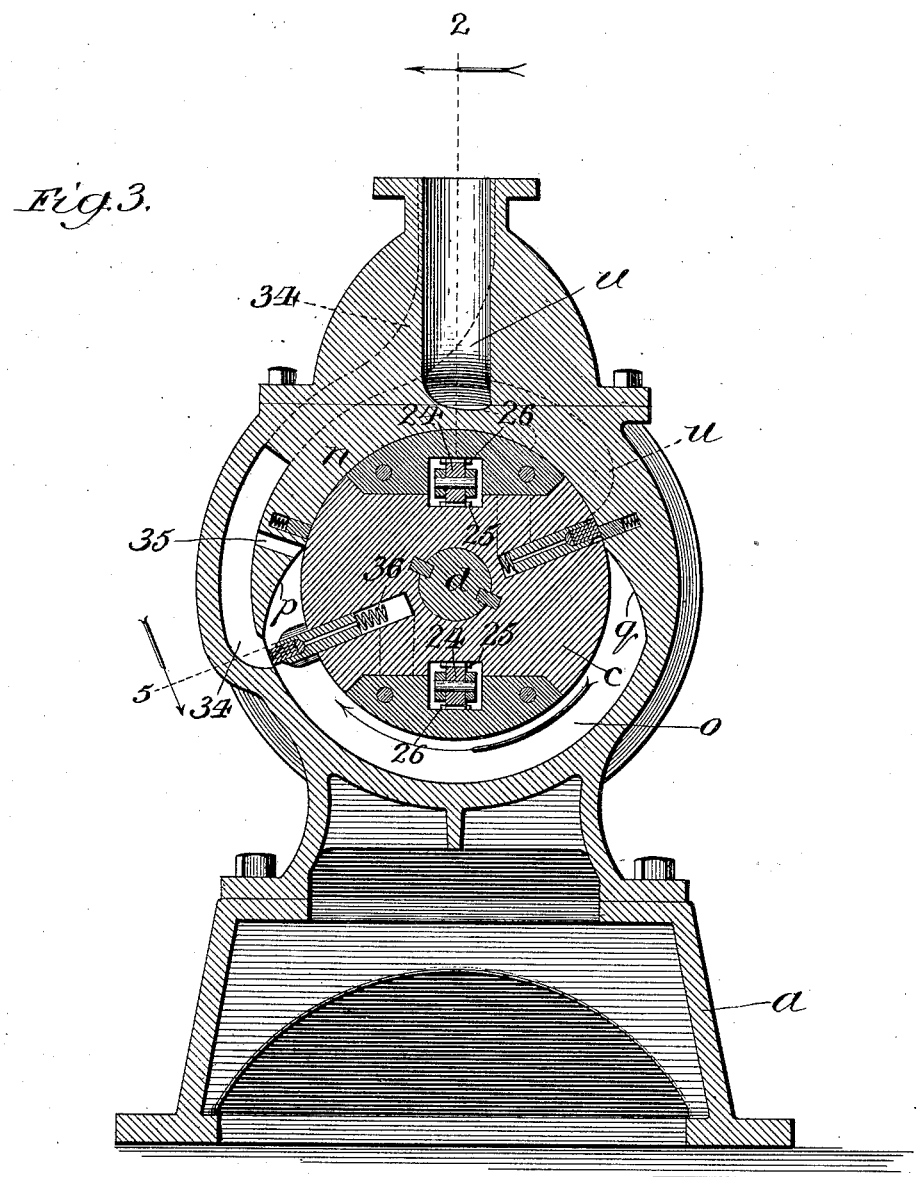

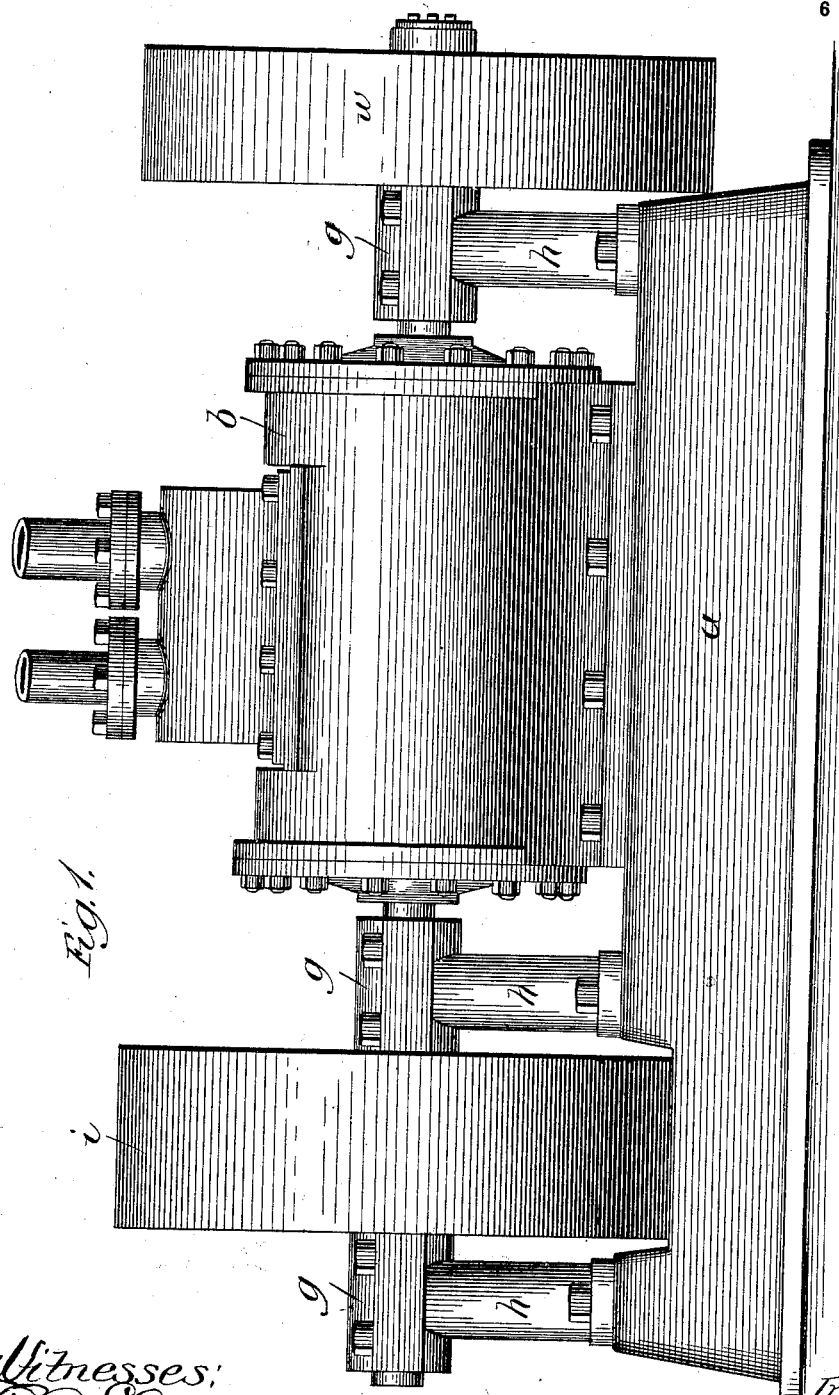

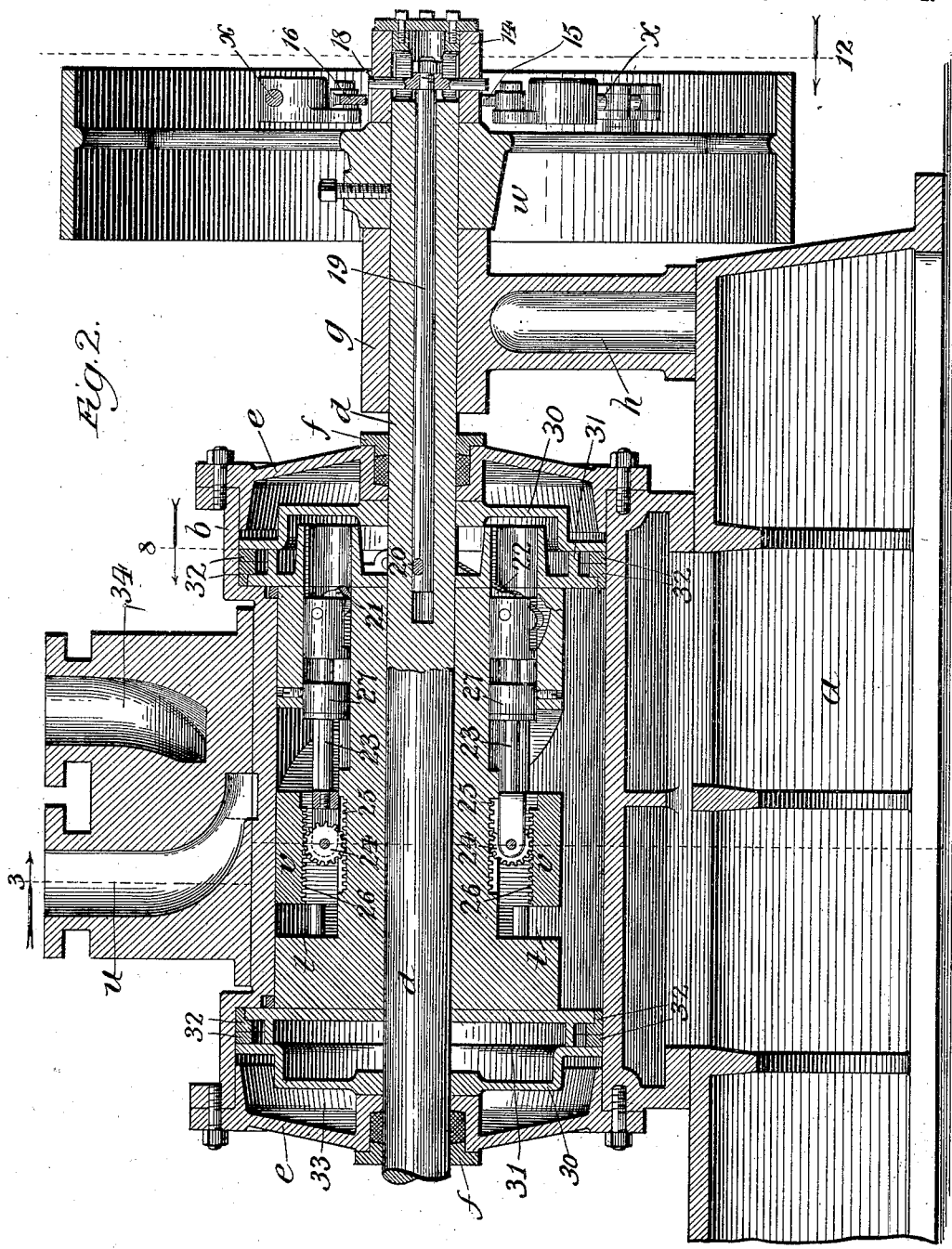

No. 701,339. Patented June 3, 1902.
F. A. HEADSON.
ROTARY ENGINE.
(Application filed Nov. 15, 1900.)
(No Model.) 6 Sheets—Sheet 4.
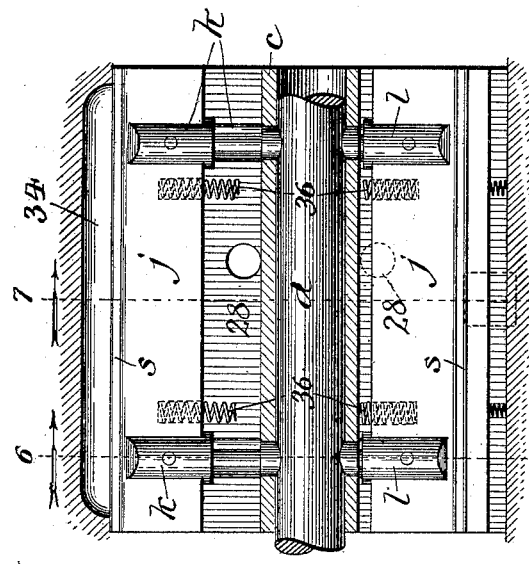
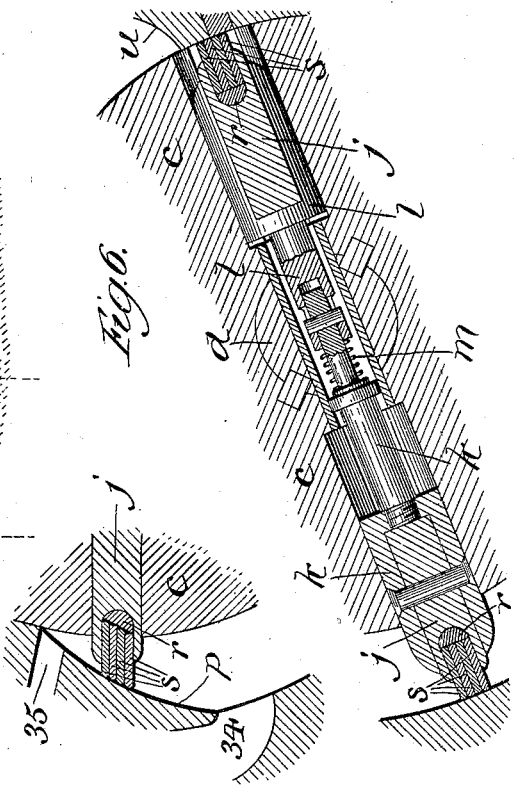
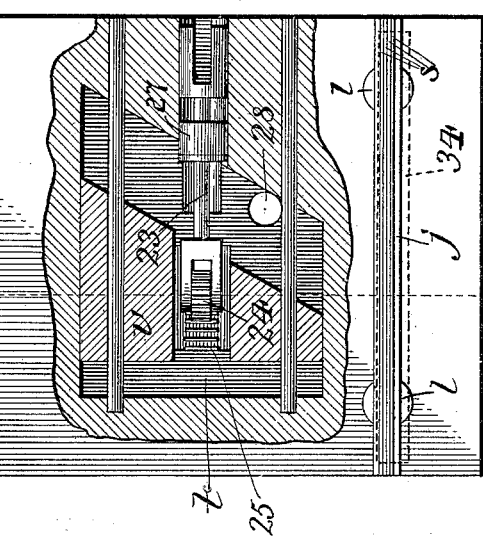
Witnesses:
Inventor:
Frank A. Headson
By Thomas F. Sheridan
Atty.

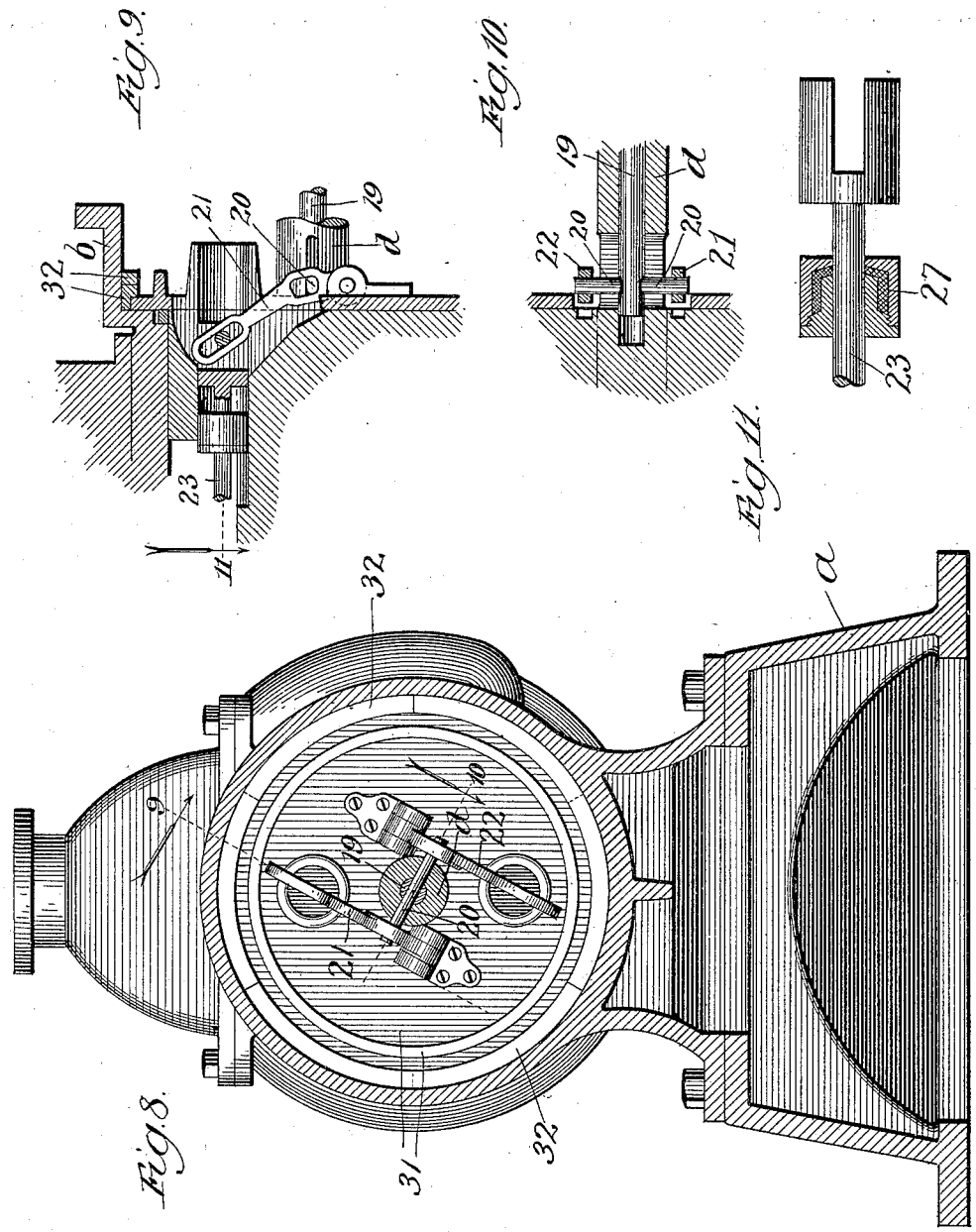

No. 701,339. Patented June 3, 1902.
F. A. HEADSON.
ROTARY ENGINE.
(Application filed Nov. 15, 1900.)
(No Model.) 6 Sheets—Sheet 6.

UNITED STATES PATENT OFFICE.

FRANK A. HEADSON, OF LAFAYETTE, INDIANA, ASSIGNOR OF ONE-HALF TO LEO POTTLITZER, HERMAN POTTLITZER, JULIUS POTTLITZER, AND MAX POTTLITZER, OF LAFAYETTE, INDIANA.

ROTARY ENGINE.

SPECIFICATION forming part of Letters Patent No. 701,339, dated June 3, 1902.

Application filed November 15, 1900. Serial No. 36,576. (No model.)

*To all whom it may concern:*

Be it known that I, FRANK A. HEADSON, a citizen of the United States, residing at Lafayette, in the county of Tippecanoe and State of Indiana, have invented certain new and useful Improvements in Rotary Engines, of which the following is a specification.

The invention relates to that class of engines styled "rotary engines," in which fluid under pressure is admitted into a chamber, so as to directly contact or impinge against a rotatable piston or similar mechanism to operate the same, and thus dispense with the usual reciprocating and crank mechanism of the ordinary type of engine.

The principal object of the invention is to provide a rotary engine with cut-off valves and simple and efficient means for operating the same.

A further object of the invention is to provide a rotary engine of such construction and arrangement that the leakage of steam and development of frictional force are minimized.

Other objects of the invention will more fully hereinafter appear.

The invention consists in the features, combinations, and details of construction hereinafter described and claimed.

Figure 12:
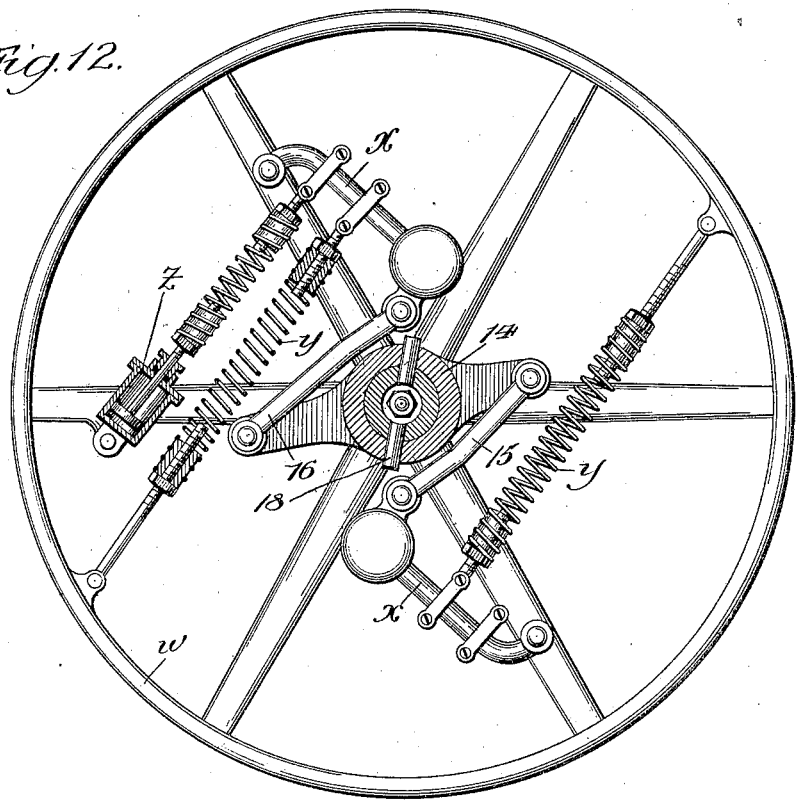
Figure 13:
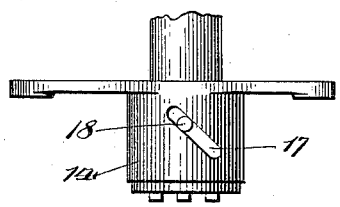

In the accompanying drawings, Figure 1 is a side elevation of a complete engine as it appears when constructed in accordance with these improvements. Fig. 2 is a vertical sectional elevation of the major portion of the engine, taken on line 2 of Fig. 3. Fig. 3 is a cross-sectional view taken on the lines 3 of Figs. 2 and 4. Fig. 4 is an enlarged "developed" view of the periphery of the rotatable piston laid in a plane. Fig. 5 is an enlarged sectional view of a portion of the mechanism, taken on line 5 of Fig. 3, looking in the direction of the arrow. Fig. 6 is an enlarged sectional detail taken on line 6 of Fig. 5 looking in the direction of the arrow. Fig. 7 is a similar view taken on line 7 of Fig. 5. Fig. 8 is a cross-sectional view taken on line 8 of Fig. 2. Figs. 9 and 10 are enlarged sectional details taken on the lines 9 and 10, respectively, of Fig. 8 looking in the direction of the arrow. Fig. 11 is an enlarged sectional detail taken on line 11 of Fig. 9. Fig. 12 is an elevation of the fly-wheel governor and its attached mechanisms, partly in section, taken on line 12 of Fig. 2, looking in the direction of the arrow; and Fig. 13 is a detail view of the governor-cam looking at it from above.

In the art to which this invention relates it is well known that there are three things which are very objectionable and generally fatal in the use of rotary engines. The first of these is the tremendous leakage of steam and consequent consumption of fuel, the second the large amount of frictional force developed during the operation of the rotatable parts, and the third the noise of the parts as they operate. My invention, therefore, is intended primarily to provide a rotary engine of the class alluded to in which these objections are minimized as much as possible and which will be simple and economical to construct and efficient in operation, all of which will more fully hereinafter appear.

In engines of this type it is well known and I have discovered by experimental use that a large amount of the fluid under pressure is wasted in that it leaks out and is permitted to escape between the mobile and stationary parts and that as a consequence when an attempt has been made to minimize the leakage of this steam or fluid under pressure the friction developed thereby has been such as to render the economical operation of the engine impossible. In order to overcome this objection, I have constructed a frame in combination with the rotatable or mobile parts which largely minimizes the leakage of the fluid under pressure and prevents to a great extent undue development of frictional force. In obtaining these results I use a base portion *a* of the desired size and shape and which is practically a rectangle when viewed in plan view. To this base portion is secured what I term the "cylinder" portion *b*, which, as shown in Fig. 1, is a rectangle in side elevation, but is practically cylindrical in contour when viewed in end or cross-sectional elevations, as shown in Figs. 3 and 8. Rotatably mounted in the operating-chamber of the cylinder portion is a piston c, which is supported upon and rotates simultaneously with a main shaft d. Each end of this operating-chamber is closed by means of a head portion e, through which the main shaft is also passed, but not supported.

To minimize the leakage of steam through the axial openings of the cylinder-heads, through which the main shaft is passed, such heads are provided with stuffing-boxes f, which serve to prevent the leakage of steam, but do not in any material sense support the main shaft or permit the development of frictional force thereby. The main shaft has its bearing portions journaled in three boxes g, supported on the main frame by means of three standards h, which are preferably secured by means of bolts to the base portion, this means being preferred to the integral castings in that it permits of the easier handling and finishing of the parts. A careful examination of the drawings and the foregoing will show that there are two distinct advantages inherent in an engine constructed in accordance with these improvements, the first being the minimizing of the leakage of steam in the cylinder-heads through which the main shaft is passed by having the boxes which support the journals of the main shaft independent of the cylinder—that is, disconnected therefrom so as to prevent the conduction of heat, which consequently prevents the bearing metal from expanding and the development of undue frictional force.

A driving or balance wheel i is secured to the main shaft so as to be rotated thereby between two of the boxes and their supporting-standards, so that when pulling a load it minimizes the danger of wearing the bearing portions therein in an elliptical manner or to one side by the pulling of the main shaft out of line or at an angle to the axis of the cylinder. The governor-wheel, as will be more fully hereinafter described, is preferably mounted on the other extreme end of the main shaft, and as it has very little work to do it does not tend to wear the bearings in an irregular manner.

It is highly desirable that efficient mechanism be provided to receive the impact of the steam or other fluid under pressure, take advantage of the direct impulse thereby and expansion thereof, and impart the necessary rotation to the piston. To accomplish this result, the piston is preferably provided with two longitudinal wing-grooves, in which are mounted two radial wings j, which reciprocate therein in a radial line and by the means hereinafter described. To minimize the objectionable feature of noise incident to the independent striking of one wing against the shell of the cylinder and the other wing against the bottom of the groove and compel them in a measure to move simultaneously in the same direction, but in different directions as regards the axis of the piston, such wing portions are connected together by means of the studs k and l, which are telescopically fitted together, as shown particularly in Fig. 6. These studs, as above suggested, are telescopically fitted together, but have very slight independent movements in a radial direction, which is permitted by the cushioning-spring m, which is inserted between one stud and a shoulder on the other. This spring is of such tension that it compels both of such wings to move simultaneously or together; but when they strike the curved portions of the cylinder, as hereinafter described, it permits one of them to move for a small portion of time and a short distance independent of the other, but compels the other to follow its curve and move out at a certain rate of speed, but not too violently. The operating-chamber of the cylinder (see Fig. 3) is practically a smooth continuous cylinder, the upper portion of which, however, is broken in its symmetrical shape by the interposition of what I term an "inwardly-projecting bushing" n, which is preferably integral with the main cylinder and against the inner surface of which the periphery of the piston rubs. This inwardly-projecting bushing fills a space which would otherwise exist between the upper portion of the piston-periphery and the walls of the cylinder and leaves a space which forms the operating-chamber o, semicircular in shape, between the lower portion of the piston-periphery and the walls of the cylinder. The ends of the inwardly-projecting bushing are curved, as at p and q, so that as the piston rotates in the direction indicated by the arrow one wing strikes the curve and is forced inwardly for a short distance, when the telescopic connecting-studs contacting together force the other wing outwardly. These curves p and q are of such shape that all points thereof are substantially the same distance apart in lines across the diameter of the piston, which distance equals practically the largest diameter of the wings when extended. This arrangement of the curves is such as to minimize the too-sudden jumping of one or both of the wings, which is responsible for the objectionable noisy feature. It is desirable that the wings be of such construction that the outer edge thereof can easily follow the shape of the inner wall of the cylinder and curves of the bushing as closely as possible and in what might be termed a "flexible" manner. In order to accomplish this result, (see Figs. 6 and 7,) the outer edges of the wings are provided with longitudinal grooves extending clear across. In the lower part of each groove is laid a semicircular strip r, the curved portion of which rests against the curved bottom of the groove. Resting upon this semicircular strip is a plurality of strips s, movably held in the groove, so that they may have independent motions and be adjusted automatically, as shown in Fig. 7, when the wing is contacting the curved portions of the inwardly-projecting bushing. These strips are made of aluminium and may conform closely to such curves at any and all points, and thereby minimize the objections of leaking by the same, which would otherwise be a very objectionable feature.

For the purpose of admitting steam into the operating-chamber, cutting it off, and exhausting it at desired times the periphery of the piston is provided with two pockets $t$, diametrically opposed to each other, adapted to cover and uncover the inlet-opening $u$ and connect it with the pressure-chamber behind one of the wings to the right of Fig. 3, so that when such wing is moving the admission of the motive fluid continues until the pocket has passed by the inlet-opening and shut off the same. Each of these pockets, as shown in the developed view of Fig. 4, has one side wall at right angles to the front and rear walls of the pocket and the other side wall at an incline or angle thereto, preferably the right-hand side, at which point the pocket is brought into alinement with the inlet-opening, as shown in Fig. 4. Each of these pockets is provided with a slidable cut-off valve $v$ of substantially the same shape as the pocket and adapted to be moved back and forth across the same to open or close the space between the inclined edge of the same and wall of the pocket, and thus regulate the cut-off of motive fluid at the desired time or times. To operate these cut-off valves as efficiently as possible and as sensitively as may be desired to obtain the desired speed or speeds, a fly-wheel governor is provided, composed of a fly-wheel $w$, having ball-levers $x$ pivoted to the arms thereof and held under the proper tension by means of centripetal springs $y$ and in the desired positions by the dash-pot $z$. These ball-levers, as is usual in such mechanisms, are adapted to be moved inwardly and outwardly by the centrifugal action developed during the rotation of the wheel and inwardly by the centripetal springs to operate the rotatable sleeve-cam 14, which is mounted upon the main shaft and connected with the ball-levers by means of the links 15 and 16. This rotatable cam-sleeve has two grooves 17, extending through the periphery thereof at points diametrically opposite, through which a pin or pins 18 is passed. This pin connects with a sliding connecting-rod 19, extending through an axial opening in the main shaft. The other end of the connecting-rod is provided with a pin 20, which extends out through the main shaft and engages with two pivotal lever-arms 21 and 22, which in turn are pivotally engaged with the independent valve-rods 23, the inner ends of which carry spur-pinions 24. These spur-pinions on the valve-rods are loosely and rotatably mounted thereon and engage with rack-surfaces 25 in the piston-pockets and 26 on the lower side of the cut-off valves. An examination of the drawings and the foregoing description of construction and operation will show that a very slight operation of the sleeve-cam results in a multiplied motion of the valve-levers and through the action of the loose pinions moves the slidable cut-off valves backward and forward at twice the speed of the valve-rods, all of which is necessary to obtain a sensitive and quick-acting cut-off valve. These valve-rods are passed through small stuffing-boxes 27, which minimize the leakage of the steam from the valve-pockets.

In order to assist in the movement of the wings in an outward manner and by the action of the motive fluid, each of the valve-pockets is provided with passages 28, which connect therewith and with the winged grooves beneath the wings, as shown clearly in Figs. 4 and 5, so that as the fluid under pressure is admitted to the proper valve-pocket it immediately starts the wing traveling in an outer direction against the curve $q$, to assist the opposite wing in taking the other curve, which also helps to minimize the objectionable feature of noise.

To further minimize the leakage of steam in the parts, the main shaft is provided with what might be termed "piston-heads" 30 and 31, made in two parts, at each end of the piston, which travel in a cylindrical chamber slightly larger than the diameter of the piston or of a diameter equal to twice the radius of the operating-chamber. Between these piston-heads, which form annular grooves provided with metallic packing-rings 32, the motive fluid as it enters the operating-chambers is confined in direct engagement with the radial wings, thus minimizing the escape of steam as much as possible into the spaces 33. Should any motive fluid leak into either space 33 it expands somewhat, and thereby relieves the stuffing-boxes $f$ of as much work as possible, all of which will be fully appreciated by those skilled in the art.

To exhaust the steam or other motive fluid at the proper time, the cylinder-casing is provided with an exhaust-passage 34, which connects with the operating-chamber, preferably at a point slightly below its axis, so that as one of the wings passes the same the fluid under pressure will begin to escape. A small amount of the fluid under pressure might possibly be confined between the wing and the curved portion of the bushing, and in order to permit its escape a supplemental passage 35 is provided, which connects with the exhaust-passage and permits such pressure as might be confined in the space above mentioned to escape therethrough.

To form a cushion for the wings and prevent their striking rigidly against the bottom of the wing-grooves in the piston, each of such wings is provided on its inner side with one or more helical springs 36, as shown in Figs. 3 and 5, which strike against the bottom and prevent injury to the parts, as well as minimizing the objectionable feature of noise.

I claim—

1. In an engine of the class described, the combination of a casing having an operating-chamber and inlet and outlet passages therefor, a piston rotating in said chamber provided with one or more steam-pockets in the periphery thereof arranged to cover and uncover the inlet-opening and thereby govern the admission of motive fluid, a slidable cut-off valve in each pocket, and rack-and-pinion mechanism for operating said valves, substantially as described.

2. In an engine of the class described, the combination of a casing having an operating-chamber and inlet and outlet passages therefor, a piston rotating in said chamber and provided with one or more steam-pockets in the periphery thereof arranged to cover and uncover the inlet and thereby govern the admission of motive fluid, a slidable cut-off valve in each pocket, rack mechanism on the pocket-wall and on the valve, a spur-pinion engaging both racks to multiply the movement of the valve, and rod-and-lever mechanism arranged to operate the pinion, substantially as described.

3. In an engine of the class described, the combination of a cylinder-casing having an operating-chamber and inlet and outlet passages therefor, an inwardly-projecting bushing secured to and forming a part of the casing through which the inlet-opening extends and provided with curves at each end, a rotatable piston mounted in the chamber and provided with longitudinal wing-grooves, wing mechanism in each of said grooves provided with a packing in the outer edge thereof consisting of a strip arranged in the bottom thereof provided with a cylindrical contacting surface, and a plurality of longitudinal strips arranged thereon capable of adjusting themselves automatically to the surface of the cylinder, substantially as described.

4. In an engine of the class described, the combination of a cylinder-casing having an operating-chamber and inlet and outlet passages therefor, an inwardly-projecting bushing secured to the casing provided with curved ends which form a part of the walls of the operating-chamber and through which bushing the inlet-opening extends, a rotatable piston mounted in such chamber and provided with longitudinal wing-grooves diametrically opposite to each other, a wing in each of such grooves connected together across the diameter of the piston and each having a longitudinal packing-groove in the outer edge thereof, a semicylindrical strip arranged in the bottom of the packing-groove of each wing, a plurality of strips laid on edge in contact with each other and resting upon the upper surface of the semicylindrical strip forming a packing which automatically adjusts itself to the surface of the cylinder, and spring mechanism inserted between the inner side of the wings and the bottom of the wing-grooves in the piston to form a cushion for such wings, substantially as described.

5. In an engine of the class described, the combination of a base portion, a cylinder secured thereto provided with a head at each end thereof having stuffing-boxes therein, a piston rotatably mounted in the cylinder and having its shaft extending out through the stuffing-boxes of the cylinder-heads, and piston-heads secured adjacent to each end of the piston made in two parts and provided with packing-rings 32 between such parts to confine the motive fluid between them, substantially as described.

FRANK A. HEADSON.

Witnesses:
HANNAH MEYER,
GEO. M. FORESMAN, Jr.